United States Patent
Sutton

[11] 3,893,641
[45] July 8, 1975

[54] FLOW FORM DEVICE

[76] Inventor: Stephen John Sutton, 16 Edgevalley Dr., Islington, Ontario, Canada

[22] Filed: Apr. 18, 1974

[21] Appl. No.: 462,027

[52] U.S. Cl. .............................. 244/145; 244/142
[51] Int. Cl. ............................................. B64d 17/18
[58] Field of Search .............. 244/16, 142, 145, 152

[56] References Cited
UNITED STATES PATENTS

| | | | |
|---|---|---|---|
| 3,749,337 | 7/1973 | Jalbert | 244/145; 244/142 |
| 3,822,844 | 7/1974 | Sutton | 244/145 |
| R26,427 | 7/1968 | Jalbert | 244/142 |

Primary Examiner—Trygve M. Blix
Assistant Examiner—Paul E. Sauberer
Attorney, Agent, or Firm—Stein & Orman

[57] ABSTRACT

A flow form device of the type used primarily to maintain both vertical and horizontal stability and maneuverability in a predetermined fluid environment. The flow form device basically comprises four structural elements of interrelating shape and construction to define a predetermined configuration. Additionally, a plurality of Jordan clusters are formed in the first and second skins, and a plurality of holonomic ports are formed in the third skin to maximize the stability and maneuverability characteristics of the device. Primarily to enhance the horizontal and vertical stability and maneuverability of the device, a jet port is formed along a trailing edge of the device. Finally, a jiro port is formed in the second skin in communicating relation with the jet port.

36 Claims, 9 Drawing Figures

FLOW FORM DEVICE

BACKGROUND OF THE INVENTION

1. Field of the Invention

The present invention relates to a flow form device of the type primarily used to maintain both vertical and horizontal stability and maneuverability through a predetermined fluid environment.

2. Description of the Prior Art

Numerous devices are known in the prior art for controlling both the vertical and horizontal passage of an article through a predetermined fluid environment. Such prior art devices may generally be classified as falling within one of three broad classifications: submarine and diving wing construction for use in liquid environments; flexible parachute constructions for use in gaseous environments; and rigid airfoil constructions also utilized in gaseous environments. However, a study of the prior art devices in these three broad categories immediately reveals that numerous problems associated with vertical and horizontal stability and maneuverability remain unsolved. For purposes of illustrating the state of the prior art only, and in no way limiting the scope of the present invention, reference will now be had to representative prior art devices which may be generally classified as disclosing parachute structures.

U.S. Pat. No. 2,683,575, discloses a vented sector parachute construction forming a canopy having long and short gores alternately arranged around its center to provide spaced air vent openings in the canopy between the longer gores, intermediate the bottom edge and the center of the canopy. The ostensible purpose of the construction disclosed therein is to provide a parachute having comparatively low bulk, high drag and soft opening shock. These objects are achieved by the elimination of thirty per cent to fifty per cent of the material usually employed in conventional parachute canopies of similar size. While the vented sector parachute disclosed therein results in a slower descent rate than that of a nonporous sheet canopy having a similar amount of fabric material, the problem of controlling the rate of descent is not solved thereby. Furthermore, no means whatsoever is disclosed for affecting or controlling horizontal flight of the vented sector parachute.

A similar disclosure of air escape slits spaced around a dome-shaped sheet is shown in U.S. Pat. No. 2,734,706, relating to a multicell parachute canopy. The disclosure of this patent teaches that by virtue of the construction and placement of its air escape slits, the oscillation common to such devices is minimized and practically eliminated. In recognition of the problem of controlling the lateral, or horizontal, direction of movement of the parachute, this device also broadly teaches the use of a controllable system comprising a flap-like panel when directional controls are required.

U.S. Pat. No. 3,298,639, relating to a gliding parachute, is specifically directed to the problems of controlling and maximizing the horizontal flight characteristics of a parachute structure. That patent discloses means comprising air exhaust vents, both at the sides and to the rear of the parachute canopy, for increasing the angle of attack of the parachute and for providing a parachute which possesses a high lift to drag ratio. However, a study of the device disclosed therein reveals that the construction and placement of its air exhaust vents adversely affects its flight charactristics on performing turning maneuvers. The device is furthermore susceptible to unstable characteristics occasioned by relative motion of the payloads suspended therefrom.

In recognition of the problems and limitations associated with conventional canopy-type parachute structure, numerous glide parachute configuations employing cellular construction and ram air systems are known in the prior art. The following patents disclose structures considered to be representative of such glide parachutes:

U.S. Pat. No. 3,131,894
U.S. Pat. No. 3,285,546 (Canadian Pat. No. 786,201)
U.S. Pat. No. Re 26,427
U.S. Pat. No. 3,428,277
U.S. Pat. No. 3,524,613 (Canadian Pat. No. 866,629)
U.S. Pat. No. 3,749,337

Each of the patents listed immediatly above disclose parafoil devices which rely on a ram air scoop to keep them inflated. The devices are all generally in the form of a hollow wing made of flexible material, the wing being closed except for an opening or openings through which air may enter to inflate it. Of these, U.S. Pat. Nos. 3,285,546, and Re 26,427, are considered to be particularly representative.

Both devices disclosed therein relate to multicell wing type aerial devices having a top skin and a lower spaced-apart bottom skin. The skins are disposed in spaced relation to each other by flexible ribs that are fixed to the top and bottom skins and so shaped as to constitute an airfoil with the rib constituting air channels. The leading edge of each device is open to provide a ram air scoop for inflating the devices, and the trailing edge of each device may be either open or closed. As is immediately apparent from studying these devices, their inflation and maintenance of desirable flight attitudes are directly related to "scooping" equal quantities of air into each of the cells of the device. Thus maintaining a constant angle of attack along the leading edge of these devices is absolutely necessary to the maintenance of flight stability. It is therefore immediately apparent that during turning maneuvers both the horizontal and vertical stability of these devices are adversely affected. Furthermore, both these prior art devices teach that the placement of a payload and means for attaching that payload to the devices are critical to maintaining proper flight characteristics. The payloads must be disposed so as to provide for even distribution of suspension pressure upon the devices to allow the bottom skin to retain a flat surface like an airplane wing.

U.S. Pat. No. 3,524,613, relating to a flexible gliding wing, discloses a device similar to that of U.S. Pat. No. 3,285,546. This device teaches the use of openings formed through the side walls of each cell near the rear of the ram air scoop for the purpose of allowing air to flow laterally within the air scoop from one cell to another so as to equalize the pressures therein. These air passages are openings, therefore, assisting in inflating the device when it is deployed and also tend to equalize the pressure if the air entering the air scoop throughout the width of the device as the direction and the angle of attack of the device vary with respect to the air stream. However, successful flight of the device disclosed by this patent still most directly relates to the presentation of a constant, downward angle of attack at the leading edge of the device, thereby assuring that the ram air structure can "scoop" sufficient quantities of air to maintain the inflation of the device.

U.S. Pat. No. 3,749,337, relating to an aerial sled, discloses a flexible airfoil of cellular construction. Valve means are provided for automatically inflating the sled upon its deployment. Once the sled is inflated, the valve means are self-closing to maintain the predetermined airfoil configuration. For the remainder of its flight, no air enters the sled and it functions essentially as a glide wing. Thus, once inflated, the leading edge of the sled is slanted slightly downwardly, and the sled will inevitably have a forward motion in the direction of that leading edge. Because no control means for the sled are disclosed, it is obvious that any external force affecting the relative position of the sled's payload will necessarily tend to re-orient the leading edge, resulting in erratic and often undesirably flight characteristics.

It is thus apparent that there is a great need in the art for a device possessing many characteristics combining both stability and maneuverability as the device passes through a predetermined environment. Of course, such stability and maneuverability must be controllable with respect to both horizontal and vertical planes. Such a device should be capable of construction from either rigid or non-rigid materials. As will all articles of manufacture, the construction of the device must be economical, and its manner of operation must be simple. The device should be acceptable for use in any fluid environment, and particularly in either air or water. When utilized in a gaseous environment, the device should be selfdeploying, requiring no external reefing system. The devide should be capable of construction in virtually any known geometric configuration. The accepted principles of aerodynamic and fluid-flow forces should in no way detract from the device's stability and maneuverability. The adverse effects normally associated with the placement and relative movement of the device's payload should be eliminated insofar as is possible, and the device should be so designed and constructed as to fully utilize all fluid flow forces resulting from its passage through its environment.

SUMMARY OF THE INVENTION

This invention relates to a flow form device of the type used primarily to maintain both vertical and horizontal stability and maneuverability in a predetermined fluid environment. By virtue of the design and construction of the device, it is applicable for use in virtually any fluid environment, and may be constructed in either a rigid or non-rigid form as required by the particular environment. Furthermore, the device of the present invention may be constructed to define virtually any known geometrical configuration, including combinations of such configurations.

Thus, there is provided by virtue of this invention, a truly unique flow form device of broad application possessing broad parameters of stability and maneuverability with respect to both vertical and horizontal planes heretofore unobtainable. Because of the unique results obtained through the use of this device, its construction and operation will hereinafter be described in terms particularly suited to the device, which terms will be fully defined herein.

It has been determined that the characteristics exhibited by a form as it passes through a fluid environment are determined primarily by four variables and their relationships to each other. These variables have been designated skins I, II, and III, and payload respectively. Skin I is defined by the top skin of the present flow form device. Skin II is defined by the bottom skin of the device. Skin III includes a plurality of rib-like structures running from the leading edge of the device to its trailing edge, and interconnecting skin I and skin II. Payload refers to the payload which is attached to the device and which is transported through the fluid environment by the device, and the means for attaching the payload to the device.

Accordingly, the flow form device basically comprises a first skin means of predetermined configuration, a second skin means of corresponding predetermined configuration disposed beneath and in corresponding relation to the first skin, a third skin means disposed in interconnecting relation between the first and second skin, and a payload means attached to, and generally depending from, the device. At this point, it should be noted that the volume defined at their perimeters by the first, second and third skins is defined as a spor means. Thus, the flow form device must include at least one spor means. However, skins I, II and III may be configured and dimensioned to include any number of spor means greater than one. It should also be apparent that the shape and cubic displacement of any individual spor means are determined by the relative disposition of the first, second and third skins, and that this relative disposition may in turn vary depending upon the overall configuration of the device. One end of the spor means defines the leading edge of the device, and the trailing edge of the device is defined by at least a portion of the spor means being closed at its opposite end.

In order to enhance the stability and maneuverability characteristics of the device, it has been determined that it is desirable to form air passages at various predetermined points along skins I, II and III. Air passages formed through the first skin are termed first Jordan clusters; those formed through the second skin are termed second Jordan clusters; those formed through the third skin are termed holonomic ports. The first and second Jordan clusters and the holonomic ports are formed in the device so that each spor means communicates with at least one of each type air passage. Thus, there is maintained a constant three-dimensional flow of fluid in terms of pressures, volumes and rigidity, through the device. Fluid enters the device primarily through the second Jordan clusters formed in the second skin. Fluid exits the device primarily through the first Jordan clusters formed in the first skin. Finally, fluid passes between adjacent spor means through the holonomic ports formed in skin III. Though not mandatory, it may be desirable to leave all or portions of the leading edge of the device open, thereby providing additional apertures through which fluid may enter the device. As will be described in more detail hereinafter, the relative disposition and size of individual first and second Jordan clusters and of holonomic ports may be varied to obtain desirable stability and maneuverability characteristics for particular form configurations.

The device further includes a jiro port means formed in the second skin means around the mid-point of the second skin. The jiro port means is formed in a substantially circular configuration, and the size of its diameter is predetermined in relation to the size of the first and second Jordan clusters, as will be more fully described hereinafter. At this point, it is sufficient to note only that the jiro port means is substantially larger than any of the Jordan clusters or holonomic ports. Accordingly, the jiro port means provides a ready access for large quantities of fluid to enter and exit the device. As fluid enters the jiro port means, it creates flow pressures which interact with the flow pressures already present in the device as a result of the first and second Jordan clusters and holonomic ports. These flow pressures combine to form a substantially spherical cushion of fluid on which the device travels. Because the spherical cushion is always present at the center of the device as it travels through fluid, it is termed an intransitive hub. Because the surface of this intransitive hub is formed from the combined fluid flow pressures within the device, the intransitive hub is said to have spherical surfaces of transitivity.

Though the intransitive hub is invisible inasmuch as it is formed as a result of the combining of fluid flow pressures, its presence within the device is immediately identifiable in the form of a hump, or bubble, formed in skin I immediately above the jiro port means. To insure the structural integrity of the device, root cross stem enforcer means are formed in skin I in corresponding relation to the jiro port means. Similar root cross enforcer means may be formed in the outermost skin III means in corresponding relation to the holonomic ports.

In order to maximize the horizontal stability and maneuverability of the device, the device further comprises jet port means defined by a portion of the spor means being open at its aft end. As should be obvious, the jet port provides an exhaust for the fluid flow pressures formed within the device. This necessarily tends to move the device horizontally, with a corresponding enhancement of vertical stability and maneuverability. To fully utilize the energy generated by this exhaust of fluid flow pressures, the device further comprises transitive manifold means formed between the first and second skins in communicating relation between the intransitive hub and the jet port. The transitive manifold comprises a truncated pentahedron including an open apex disposed in communicating relation with a portion of the spherical surface of the intransitive hub. The transitive manifold further comprises an open base coextensive with the jet port, and side walls of substantially equal width extending radially from the perimeter of the intransitive hub in interconnecting relation between the first and second skins. The side walls need not be continuous, but may take the form of a plurality of spaced apart strut means. That is to say, it is not necessary that the manifold side walls block the flow of fluid within the device. In fact, even in the complete absence of side walls, the fluid flow pressures within the device accomplish substantially the same result. In fact, fluid flow pressures within the device may actually create a reverse transitive manifold in corresponding relation to the transitive manifold in the forward half of the device.

In order to maximize even further the stability and maneuverability characteristics, it has been found desirable to incorporate fluid flow regulating means in the structure of the device. Accordingly, the device further comprises at least first and second fluid flow regulating means integrally formed on the first, second and third skins in fluid communicating relation to the closed portion of the spor means. One end of the fluid flow regulating means actually defines the trailing edge of the device; therefore, the fluid flow regulating means may be visualized as extensions of the closed spor means. In keeping with their purpose of maximizing stability and maneuverability characteristics, each of the fluid flow regulating means is operably independent one from another. For reasons which will be more fully explained with regard to a preferred embodiment of the present invention, it has further been found desirable to correspondingly vary the longitudinal dimension of each fluid flow regulating means with respect to the third skin means of the device. That is, the trailing edge of a device including these fluid flow regulating means defines a wing-like taper extending from points substantially adjacent the jet port to the outboard edge of the outermost, or tensor, spors. The fluid flow regulating means further comprise a plurality of matrix tri-vent means formed in skin II thereof, and a plurality of second holonomic ports formed in skin III thereof. Again, the exact construction of the fluid flow regulating means and their relationship to the entire device will be discussed in greater detail hereinafter with respect to a preferred embodiment of the device. It is sufficient to note at this point simply that the fluid flow regulating means materially enhance the stability and maneuverability characteristics because of their functioning as thrusters, stabilizers, and additional conduits for the passage and control of fluid flow pressures created within and without the device.

In those flow form devices constructed to comprise more than one spor means, it has been found desirable to modify the structure of the tensor spors. The modification effectively results in the formation of tensor spors having a cubic displacement substantially greater than that of adjacent spor means, and provides for the storage of additional quantities of fluid within the device in such fashion that these additional quantities are automatically available to maintain desirable stability and maneuverability characteristics during the device's passage through its environment. The modification is accomplished by splitting the skin III means defining the inboard wall of the tensor spors longitudinally from points on opposite sides of the corresponding holonomic ports to points concurrent with the perimeter of pentahedral fluid flow forms as hereinafter defined.

Finally, control means are provided which operatively interconnect the payload means with the fluid flow regulating means and the second skin means. The control means serve to transmit demands from the payload means to skin II and the fluid flow regulating means, which demands actually determine the device's path of travel through its environment. By varying the demands transmitted by the control means, the device can be made to travel forward, backward, up or down. The device will turn, bank, pitch and yaw. The device will even hover.

Accordingly, the construction of the present invention provides a device possessing stability and maneuverability characteristics with respect to both horizontal and vertical passage through a predetermined fluid environment heretofore unobtainable. The device fully utilizes and enhances fluid flow pressures created by its travel through its environment. In fact, by virtue of this unique construction, the device actually "reads" its fluid environment with respect to skins I, II, and III, and the payload means. Skins I, II, and III are self-forming to terms of demand transmitted from the payload means and to changes in the fluid environment.

This result and the attendant characteristics of stability and maneuverability with respect to both horizontal and vertical travel derive from the interrelationship of each individual element of the device to its other elements. These interrelationships may be expressed in mathematical terms, and result in the device construction which generates two mirror image quadratic fluid flow forms with respect to a plane perpendicular to skins I and II and parallel to skins III through the center of the device. Each quadratic fluid flow form comprises four pentahedral fluid flow forms having mutually orthogonal apex vectors disposed about the center of the quadratic fluid flow form. This construction therefore provides an intrinsic parametric transitive flow form device which permits a non-degenerative transformation of fluid flow pressures in a predetermined fluid environment.

It is intended that the flow form device of the present invention may be constructed from any suitable material, either rigid, non-rigid, or any combination thereof, as required by its fluid environment and intended use. By virtue of its construction, the device requires no external reefing system when formed from flexible material for use in a gaseous environment. Similarly, the permissible latitude allowed in disposing the payload means with relation to skins I, II and III is increased, for the device is self-forming and requires no angle of attack. Finally, as already suggested, the device may be constructed to define a circular configuration presenting virtually no leading or trailing edge, to define an equilateral triangular configuration presenting its base as the leading edge and its apex as the jet port, or any possible configuration between the extremes.

This invention accordingly comprises an article of manufacture possessing the features, properties and the relation of elements which will be exemplified in the article hereinafter described, and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings in which.

Similar reference characters refer to similar parts throughout the several views of the drawings.

DETAILED DESCRIPTION

Figures 1, 6, 7, 8:
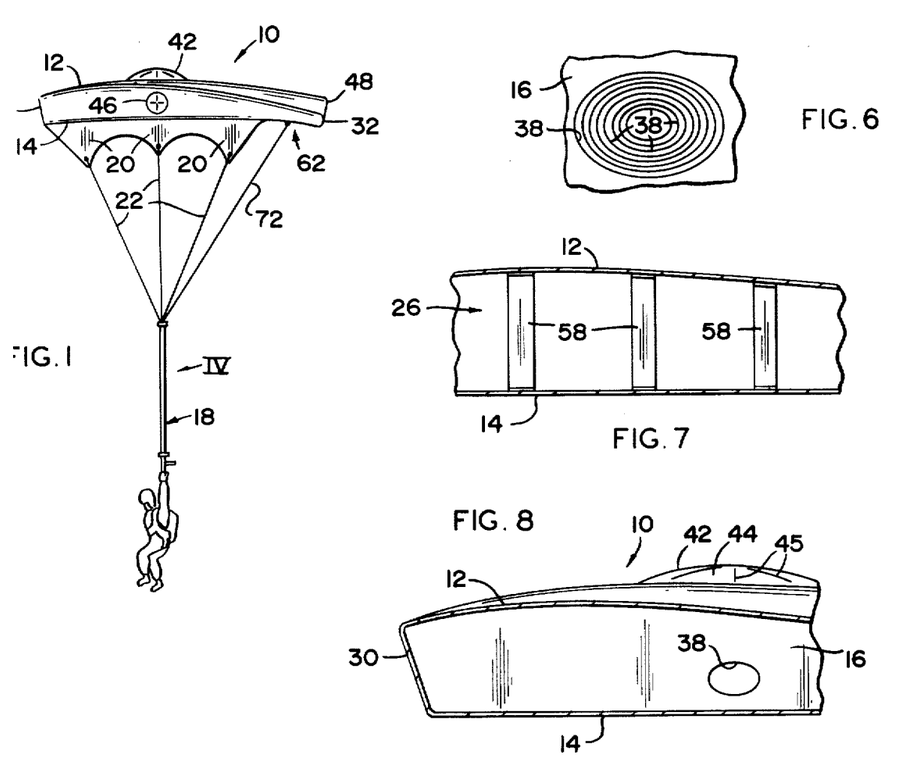
FIG. 1 is an elevational view of a preferred embodiment of the flow form device.
FIG. 6 is a fragmentary sectional view taken along line 6—6 in FIG. 5.
FIG. 7 is a fragmentary elevational view of a portion of the transitive manifold side walls.
FIG. 8 is a fragmentary sectional view similar to that of FIG. 4 showing an alternate embodiment for the leading edge of the flow form device.
Figure 2:
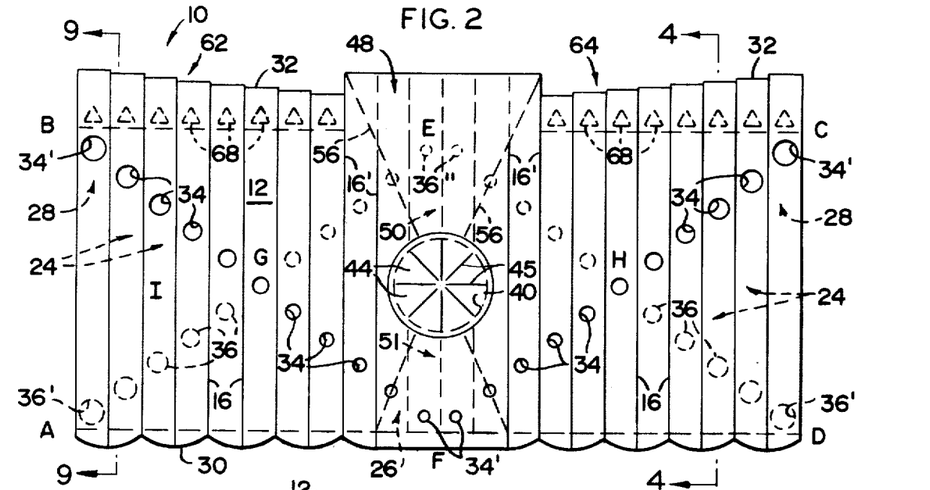
FIG. 2 is a top plan view of the flow form device.

This invention relates to a flow form device, generally indicated as 10 in FIG. 1, of the type used primarily to maintain both vertical and horizontal stability and maneuverability in a predetermined fluid environment. The device comprises a first skin means 12 of substantially rectangular configuration, a second skin means 14 of substantially corresponding configuration disposed beneath and in corresponding relation to first skin 12, a plurality of third skin means 16 disposed in interconnecting relation between the first and second skin means 12 and 14, and a payload means, generally indicated as 18 in FIG. 1, depending from the device. The payload means 18 depends from the device from substantially equilateral wedges 20 formed on second skin means 14 by means of shroud lines 22. A plurality of spor means, generally indicated as 24 in FIG. 2, are defined by the first skin 12, the second skin 14, and the third skin 16. As will be more fully explained hereinafter, the centermost spor means is domain spor 26, and the outermost spor means are tensor spors 28. Obviously, the shape and cubic displacement of any individual spor means 24 are determined by the relative placement of the first, second and third skin means 12, 14 and 16 respectively. One end of the spor means defines the leading edge 30 of the device, and the trailing edge 32 of the device is defined by at least most of the spor means being closed at their opposite ends.

Figure 3:
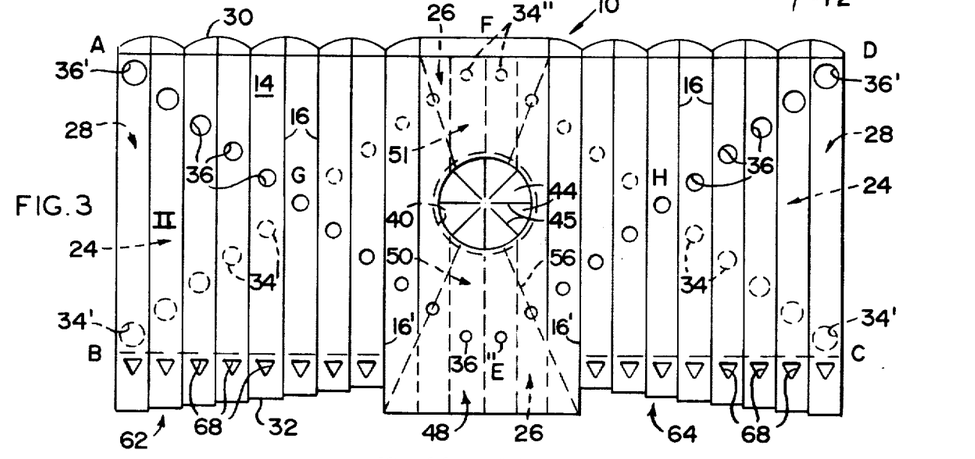
FIG. 3 is a bottom plan view of the flow form device.
Figure 4:
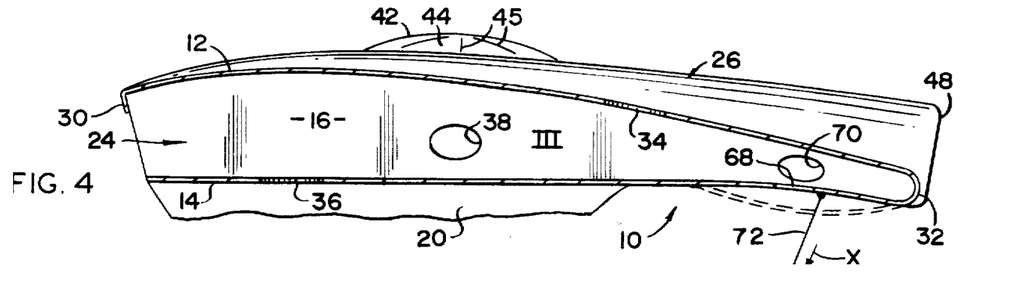
FIG. 4 is a sectional view taken along line 4—4 of FIG. 2.

Referring now to FIGS. 2, 3 and 4, air passages are formed at various predetermined points along skin means I, II and III. First Jordan clusters 34 are formed in first skin 12. Second Jordan clusters 36 are formed in second skin 14, and first holonomic ports 38 are formed in third skin 16. As best seen in FIG. 4, each spor means 24 communicates with at least one of each air passage, 34, 36 and 38. Holonomic ports 38 are formed in third skin 16 with their centers substantially parallel to leading edge 30. Furthermore, holonomic ports 38 are elliptical in shape in order to allow third skin 16 to "flex" in response to varying fluid pressures within the device. As shown in FIG. 6, holonomic ports 38 are of decreasing size, the largest holonomic ports 38 being formed in the third skins 16 which define the side walls of domain spor 26 and the smallest holonomic ports 38 being formed in the third skins 16 defining inboard side walls of tensor spors 28. The largest first holonomic port 38 is twice the size of the smallest first holonomic port 38.

As best seen in FIGS. 2 and 3, first Jordan clusters 34 and second Jordan clusters 36 comprise substantially circular air passages. First Jordan clusters 34 and second Jordan clusters 36 are spaced apart longitudinally one from the other across first skin 12 and second skin 14 respectively in inverted V configurations. Of course, at the two points where these V configurations intersect, a first Jordan cluster 34 is congruent with respect to a correspondingly positioned second Jordan cluster 36. It should also be noted that first Jordan clusters 34 and second Jordan clusters 36 are of correspondingly reducing diameter toward the apex of their respective V configurations. First and second Jordan clusters 34 and 36 communicating with a common spor means 24 are of equal size. The largest first and second Jordan clusters 34' and 36' are formed in communicating relation with tensor spors 28, and the smallest first and second Jordan clusters 34'' and 36'' are formed in communicating relation with domain spor 26. First and second Jordan clusters 34' and 36' are twice the size of first and second Jordan clusters 34" and 36".

The device further includes jiro port means 40 formed in second skin 14 around the mid point of second skin 14. Jiro port 40 is substantially circular in configuration, and its diameter is four times the size of the diameter of the largest first and second Jordan clusters 34' and 36'. Fluid flowing through jiro port means 40 reacts with fluid flow pressures already present within the device by virtue of first Jordan clusters 34, second Jordan clusters 36 and first holonomic ports 38 to form a cushion of fluid on which the device travels. As previously defined, this substantially spherical cushion is defined as an intransitive hub and its presence is identifiable in the form of a protrusion or hump 42 in skin means 12, best seen in FIGS. 1 and 4. To insure the structural integrity of the device, a root cross stem enforcer means 44 is formed in the first skin 12 in corresponding relation to jiro port means 40. Root cross stem enforcer means 44 not only strengthens the device, but also is provided with slits 45 whereby excess fluid pressures may automatically exhaust from the device. As best seen in FIG. 1, the outermost walls of tensor spors 28 also include similarly constructed root cross enforcer means 46 formed therein for the automatic bleeding of excess fluid pressures.

Figure 5:
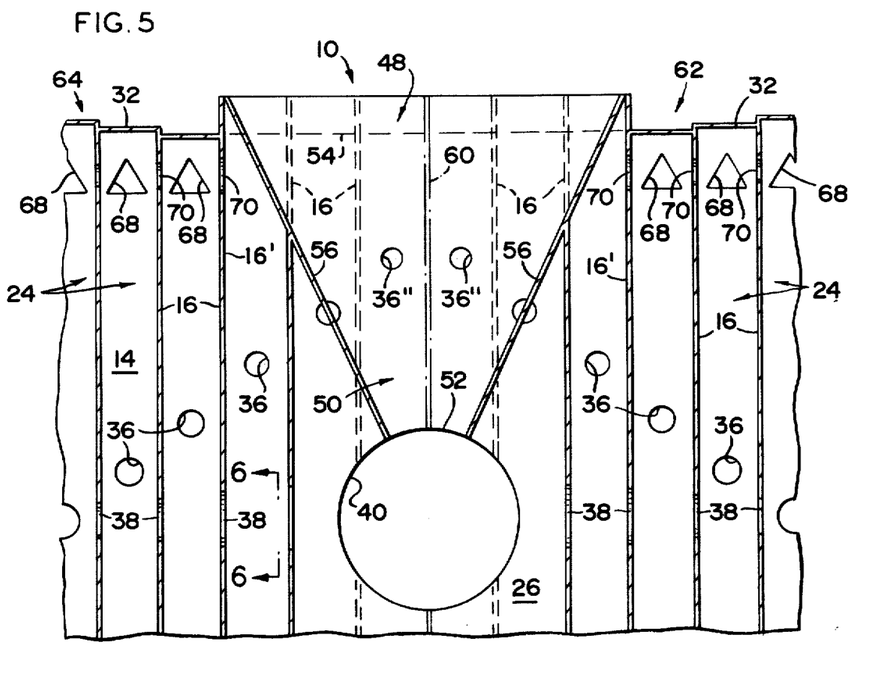
FIG. 5 is a detail plan view of a portion of the bottom of the flow form device shown in FIG. 3.

In order to maximize the horizontal and vertical stability and maneuverability of the device, the device further includes jet port means 48 defined by a portion of spor means 24 being opened at their aft ends. Jet port means 48 provides a ready exhaust for fluid flow pressures formed within the device, necessarily tending to maneuver and move the device both horizontally and vertically. A transitive manifold means 50 is formed between first skin means 12 and second skin means 14 in communicating relation between the intransitive hub formed above jiro port means 40 and jet port means 48. A detailed view of this structure for jiro port means 40, jet port means 48 and transitive manifold means 50 is shown in FIG. 5. As represented by the broken lines in FIGS. 2 and 3, a reverse transitive manifold means 51 is formed in the forward half of the device in corresponding relation to transitive manifold means 50.

With particular reference to FIG. 5, it is seen that transitive manifold 50 comprises a truncated pentahedron including an open apex 52 disposed in communicating relation with a portion of the spherical surface of the intransitive hub and an open base 54 coextensive with the jet port 48. Transitive manifold 50 further comprises side walls 56 of substantially equal length extending radially from the surface of the intransitive hub in interconnecting relation between first skin means 12 and second skin means 14. Side walls 56 of transitive manifold 50 need not be continuous, but preferably take the form of a plurality of spaced apart struts 58, as shown in FIG. 7. Additionally, as shown in FIG. 5, it is also desirable to form a rib 60 parallel to skin means 16 through the center of transitive manifold 50 and jet port 48 for the purpose of pre-forming the opening of jet port means 48. Rib 60 is preferably formed from spaced apart struts 58 as shown in FIG. 7 with reference to side walls 56.

It is further desirable to form third skin means 16 included within domain spor 26 from spaced apart strut means, as represented by the broken lines in FIGS. 2 and 3.

As best seen in FIGS. 2 and 3, the device further comprises first and second fluid flow regulating means, generally indicated as 62 and 64 respectively. First and second fluid flow regulating means 62 and 64 are integrally formed on first skin means 12, second skin means 14 and third skin means 16 in communicating relation to the closed spor means 24. Thus, as shown in FIGS. 2 and 3, one end of each of the fluid flow regulating means 62 and 64 actually defines trailing edge 32. First fluid flow regulating means 62 and second fluid flow regulating means 64 are operably independent one from the other and also from jet port means 48. Trailing edge 32 defined by first and second fluid flow regulating means 62 and 64 is tapered by varying the longitudinal dimension of each fluid flow regulating means with respect to the third skin means 16 of the device. Accordingly, each spor means 24 included within first fluid flow regulating means 62 or second fluid flow regulating means 64 is of different cubic displacement. Of course, correspondingly positioned spor means 24 on opposite sides of the device are of equal cubic displacement. It has been determined that this wing-like taper of trailing edge 32 materially enhances the stability and maneuverability characteristics of the device.

Fluid flow regulating means 62 and 64 further comprise a corresponding plurality of matrix tri-vent means 68 formed in the second skin 14 thereof, and a corresponding plurality of second holonomic ports 70 formed in the third skin 16 thereof. Each of the matrix tri-vent means 68 is defined by a triangular-shaped aperture. Ideally, each tri-vent means 68 is defined by an equilateral triangular-shaped aperture having a perimeter equal to the circumference of the congruent first and second Jordan clusters 34 and 36. An apex of each matrix tri-vent means 68 is oriented towards trailing edge 32. Each of the second holonomic ports 70 is of equal size and elliptical configuration, and one second holonomic port is formed through each third skin means 16 extending between adjacent matrix tri-vent means 68 and third skin means 16' defining side wall extremities of jet port means 48.

Finally, as best seen in FIG. 1, control means 72 are provided which operatively interconnect payload means 18 to second skin means 14 and first and second fluid flow regulating means 62 and 64. The demands transmitted from payload means 18 to second skin means 14 and first and second fluid flow regulating means 62 and 64 actually determine the device's path of travel through its environment. Arrows X in FIG. 4 show the relative movement of first and second fluid flow regulating means 62 and 64 as a result of demands transmitted through control means 72 from payload means 18. As represented by the broken lines of FIG. 4, pulling first and second fluid flow regulating means 62 and 64 downwardly creates a bubble-shaped configuration along second skin 14 somewhat inboard and transverse to trailing edge 32. This configuration is formed by virtue of control means 72 being attached to second skin 14 and first and second fluid flow regulating means 62 and 64 inboard of trailing edge 32 substantially in line with apexes of matrix tri-vent means 68. This necessarily allows matrix tri-vent means 68 to function as stabilizers and additionally conduits for the passage and control of fluid flow pressures created within and without the device. Because of the placement and size of the second holonomic ports 70, fluid flow pressures created within first and second fluid flow regulating means 62 and 64 are equalized to terms of the remainder of the device. Furthermore, when first and second fluid flow regulating means 62 and 64 are in their normal positions as shown by the solid lines in FIG. 4, matrix tri-vent means 68 function as thrusters because of their apex being oriented toward trailing edge 32.

Figure 9:
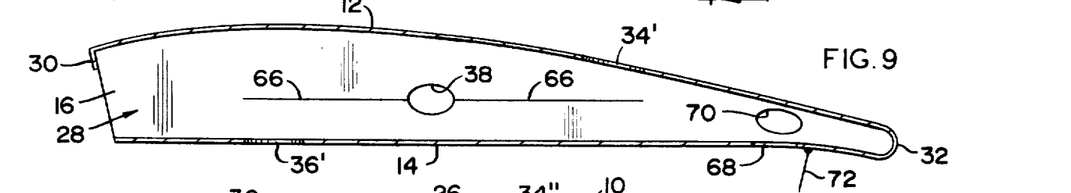
FIG. 9 is a sectional view taken along line 9—9 of FIG. 2.

As best seen in FIG. 9, it has been found desirable to modify the structure of tensor spors 28 effectively resulting in the formation of tensor spors having a cubic displacement substantially greater than that of adjacent spor means 24. The modification is accomplished by splitting third skin means 16 defining the inboard walls of tensor spors 28 longitudinally from points on opposite sides of the corresponding first holonomic ports 38 to points immediately below the circumference of first Jordan clusters 34' and immediately above the circumference of second Jordan clusters 36' to form fluid passage means 66. This modification provides for the storage of additional quantities of fluid within the device in such fashion that these additional quantities are automatically available to maintain desirable stability and maneuverability characteristics during the device's passage through its environment.

While the device has thus far been described with reference to leading edge 30 being open as shown in FIG. 4, it should also be noted that substantially all of this leading edge may be closed as shown in FIG. 8. Specifically, all of leading edge 30 except that corresponding to transitive manifold means 50 is closed. Of course, this closure may be affected by extending first skin 12 downwardly to meet second skin 14. By closing leading edge 30 as shown in FIG. 8, fluid flow pressures created within the device may actually create a reverse transitive manifold 51 in corresponding relation to transitive manifold means 50 in the forward half of the device. This actually allows the device to be fully maneuverable.

Having thus described the construction of a preferred embodiment of the device, specific relationships among various elements of this device and the operation of the device will now be discussed. As previously pointed out, correspondingly positioned first Jordan clusters 34 and second Jordan clusters 36 are of equal size. Furthermore, the diameter of the largest Jordan clusters 34' and 36' is two times that of the smallest Jordan clusters 34'' and 36''. Jiro port means 40 is formed at the center of the device, and its diameter is four times the diameter of largest Jordan clusters 34' and 36'. First Jordan clusters 34 and second Jordan clusters 36 are disposed in first skin means 12 and second skin means 14, respectively, in inverted V configurations. Accordingly, these V configurations intersect at two points, thereby presenting congruent first and second Jordan clusters 34 and 36. The circumference of the elliptical-shaped first holonomic ports 38 is inversely related to the circumference of corresponding first and second Jordan clusters 34 and 36.

That is, the samllest first holonomic ports 38 are formed in third skins 16 defining inboard side walls of tensor spors 28. These smallest first holonomic posts 38 are of a circumference equal to the circumference of first and second Jordan clusters 34'' and 36''. As the first holonomic ports 38 advance toward the third skin means defining side walls of domain spor 26 they become increasingly larger in circumference in inverse relation to the decreasing circumference of first and second Jordan clusters 34 and 36.

Each of the matrix tri-vent means 68 is of a perimeter equal to the circumference of concentric first and second Jordan clusters 34 and 36. Elliptical-shaped second holonomic ports 70 are each of a circumference equal to that of the congruent first and second Jordan clusters 34 and 36.

Thus, still with reference to this preferred embodiment and with particular reference to FIGS. 2 and 3, this construction presents a flow form device platform defined by the points A, B, C and D. The relatively small area forward of line AD represents an overhanging portion of first skin 12, and the areas aft of line BC represent first fluid flow regulating means 62, jet port means 48, and second fluid flow regulating means 64, respectively.

As shown in FIGS. 2 and 3, it should also be noted that a plane perpendicular to the device and intersecting points E and F generates two mirror image quadratic fluid flow forms defined by the points A, B, E and C, D, E and F. Moreover, each quadratic fluid flow form comprises four pentahedral fluid flow forms having mutually orthogonal apex vectors disposed about the center G and H, respectively, of each quadratic fluid flow form. For example, one pentahedral fluid flow form is defined by the points A, B and G.

This construction provides an intrinsic parametric transitive flow form device which permits a non-degenerative transformation of fluid flow pressures in a predetermined fluid environment. The device fully utilizes and enhances fluid flow pressures created by its travel through its environment. By virtue of this unique construction, the device "reads" its fluid environment with respect to skins I, II, and III and the payload, and skins I, II and III are self-forming to terms of demands transmitted from the payload and to changes in its fluid environment. That is, each individual spor means 24 will exhibit varying fluid pressures, fluid volumes, and fluid rigidity automatically to maintain maximum desirable characteristics of stability and maneuverability.

In operation, the non-rigid construction shown in FIGS. 1–8 requires no external reefing system. Of course, well known staging means are utilized to extract the device from its container and to expose the device to its environment. Once exposed the device is self-inflating and exhibits extremely low opening shock.

Because of the construction of the device, self-inflation occurs substantially from the center of the device outwardly. That is, domain spor 26 is first to inflate, and tensor spors 28 are the last of the spor means to fully inflate. As the device travels through its environment, determinable fluid flow pressures are created within the device. For example, a volume of relatively greatest fluid flow pressures is defined by the points G, E, H and F as best seen in FIGS. 2 and 3. Of course, because first skin means 12, second skin 14 and third skin 16 are self-forming to terms of demands transmitted from payload means 18 and changes in the fluid environment, fluid flow pressures, volumes and rigidity at individual points within the device are constantly variable in order to maintain the most desirable characteristic of maneuverability and stability as the device travel through its environment. In fact, each air passage formed in the device (first Jordan clusters 34, second Jordan clusters 36, first holonomic ports 38, jiro port means 40, jet port means 48, matrix tri-vent means 68, and second holonomic ports 70) allows a two-way flow of fluid therethrough. It is this two-way flow of fluid which allows the device to travel forward, backward, up or down, to turn, bank, pitch and yaw, and even to hover while maintaining maximum desirable characteristics of stability and maneuverability.

In the preferred embodiment of the flow form device described herein, fluid enters the device primarily through second Jordan clusters 36 and the open leading edge 30. Fluid exits the device primarily through jet port means 48, and to a lesser extent through first Jordan clusters 34. It is, of course, the exhaust of fluid through jet port means 48 which tends to give the device its horizontal movement and vertical stability. It should also be noted at this point that the V-shaped configuration of second Jordan clusters 36 is oriented with its apex towards trailing edge 32 to enhance the thrusting and stability action of jet port means 48 as the device travels through its environment. Similarly, first Jordan clusters 34 are arranged with the apex of their V-shaped configuration oriented toward leading edge 30 to enhance the thrusting action of jet port means 48.

As previously described, each individual spor means 24 communicates with its neighbor through first holonomic ports 38. First holonomic ports 38 are formed in an elliptical configuration to allow third skin means 16 to flex as the device conforms itself to demands transmitted from payload means 18 through control means 72 and to external changes in its fluid environment.

With particular reference to first and second fluid flow regulating means 62 and 64, it should be noted that because the apex of each matrix tri-vent means 68 is oriented toward trailing edge 32, these matrix tri-vent means 68 actually function as additional thrusters when in the extended position shown in solid lines in FIG. 4. When either or both of the fluid flow regulating means 62 and 64 are depressed, as shown in broken lines in FIG. 4, the matrix tri-vent means 68 function as stabilizers preventing the device from slipping, or skidding, in its fluid environment. In this mode of operation the matrix tri-vent means 68 also function as scavengers, or additional conduits, for the passage and control of fluid flow pressures which would otherwise flow past the device. It should be obvious that fluid flow pressures within first and second fluid flow regulating means 62 and 64 tend to equalize because of the presence of second holonomic ports 70. Of course, second holonomic ports 70 also allow those portions of third skin means 16 within fluid flow regulating means 62 and 64 to flex in response to varying fluid flow pressures. Additionally, any excess fluid flow pressures within first and second fluid flow regulating means 62 and 64 tend to exhaust through second holonomic ports 70 formed in third skin means 16', in direct communication with jet port means 48, thus also functioning as jet port stabilizers.

Finally, as previously described, the device further comprises root cross stem enforcer means 44 including a plurality of pressure control means 45 formed therein and two root cross enforcer means 46, both of which are self-actuating to allow excess fluid flow pressures within the device to bleed from the device.

Accordingly, the construction of the present invention provides a device possessing stability and maneuverability characteristics heretofore unobtainable with respect to both vertical and horizontal passage through a fluid environment. By virtue of this construction in accord with the split gravity theorem rather than generally accepted aerodynamic principles, the device fully utilizes and enhances all fluid flow pressures created by its travel through its environment. It is its unique ability to utilize and enhance these fluid flow pressures that result in the device's ability to fly forward, up, down, turn, bank, pitch, yaw, and fly backward.

While the device has been described with reference to a preferred embodiment, it is intended that the device may be constructed in any known geometric configuration or combinations thereof. Specifically, any of the individual elements of the device may be varied with regard to both its size and placement so long as the remaining elements are correspondingly varied in keeping with the split gravity theorem.

It will thus be seen that the objects made apparent from the preceding description are efficiently attained, and since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,
What is claimed is:

1. A flow form device of the type used primarily to maintain both vertical and horizontal stability and maneuverability in a predetermined fluid environment, said device comprising: a first skin means of predetermined configuration; a second skin means of predetermined configuration disposed in substantially spaced apart relation from said first skin means; a plurality of third skin means disposed in interconnecting relation between said first and second skin means; at least one spor means defined by said first, second and third skin means, one end of said spor means at least partially defining a leading edge of said device, at least a portion of said spor means being closed at its opposite end to at least partially define the trailing edge of said device; a plurality of first Jordan clusters formed in said first skin means; a plurality of second Jordan clusters formed in said second skin means; a plurality of holonomic ports formed in said third skin means; a jet port means defined by at least a portion of said one spor means being open at its aft end; a jiro port means formed in said second skin means; and control means operatively connected with said second skin means, whereby the passage of said device through a predetermined fluid environment may be controlled with respect to both horizontal and vertical planes.

2. A device as in claim 1 further comprising at least first and second fluid flow regulating means connected to said first, second and third skin means in fluid communicating relation to said closed portion of said spor means, one end of said fluid flow regulating means at least pratially defining said trailing edge, each of said fluid flow regulating means being operably independent one from another.

3. A device as in claim 2 wherein said fluid flow regulating means are of correspondingly varying longitudinal dimensions taken along said third skin means.

4. A device as in claim 3 wherein said fluid flow regulating means further comprise a plurality of matrix tri-vent means formed in said second skin means.

5. A device as in claim 4 wherein said fluid flow regulating means further comprise a plurality of second holonomic ports formed in said third skin means.

6. A device as in claim 5 wherein said control means is operatively connected with said fluid flow regulating means and said second skin means.

7. A device as in claim 6 wherein said plurality of matrix tri-vent means comprise equilateral triangular apertures.

8. A device as in claim 1 wherein the shape and cubic displacement of said spor means are determined by said third skin means and depend on said predetermined configuration.

9. A device as in claim 8 wherein the distance between said first and second skin means is variable from said leading edge to said trailing edge.

10. A device as in claim 8 wherein the distance between said first and second skin means at the middle of said device is relatively greater than said distance at said leading and trailing edges of said device.

11. A device as in claim 8 wherein said predetermined configuration is substantially rectangular.

12. A device as in claim 11 wherein the distance between said first and second skin means at said leading edge is relatively greater than said distance at said trailing edge, and wherein said third skin means is correspondingly configured to define a substantially triangular configuration, the apex of said triangular configuration being substantially adjacent said trailing edge.

13. A device as in claim 1 wherein said holonomic ports are formed in said third skin means with their center substantially parallel to said leading edge and substantially equidistant from said leading and trailing edges.

14. A device as in claim 13 wherein said holonomic ports are of greatest size at the centermost of said third skin means and are of correspondingly reducing size toward the outermost of said third skin means.

15. A device as in claim 1 wherein said first Jordan clusters are of greatest size at the outermost edges of said first skin means and are of correspondingly reducing size toward the center of said first skin means.

16. A device as in claim 1 wherein said second Jordan clusters are of greatest size at the outermost edges of said second skin means and are of correspondingly reducing size toward the center of said second skin means.

17. A device as in claim 1 wherein said first and second Jordan clusters are spaced apart one from the other across at least most of said first and second skin means.

18. A device as in claim 1 wherein said jet port means is formed at substantially the middle of said trailing edge.

19. A device as in claim 18 wherein said device further comprises intransitive hub means formed between said first and said second skin means about the midpoint of said device and transitive manifold means formed between said first and second skin means in communicating relation between said intransitive hub means and said jet port means.

20. A device as in claim 19 wherein said transitive manifold means comprises a substantially truncated pentahedron configuration including an open apex disposed in communicating relation with said intransitive hub means, an open base coextensive with said jet port means, and side walls of substantially equal length extending radially from the perimeter of said intransitive hub means in interconnecting relation between said first and second skins.

21. A device as in claim 20 wherein said side walls comprise a plurality of strut means.

22. A device as in claim 1 wherein said jiro port means is formed at substantially the center of said second skin means.

23. A device as in claim 1 further comprising payload means depending from said device and control means operatively interconnecting said payload means with said second skin means.

24. A device as in claim 23 wherein said payload means depends from said device beneath the area defined by said jiro port means.

25. A device as in claim 23 wherein said payload means depends from said device beneath the center of said jiro port means.

26. A device as in claim 1 wherein said spor means comprises a plurality of tensor spors formed at the outboard edges of said device.

27. A device as in claim 26 further comprising fluid passage means formed through said third skin means defining the inboard sides of said tensor spors.

28. A device as in claim 27 wherein said fluid passage means comprise a plurality of slits.

29. A device as in claim 1 further comprising root cross enforcer means formed through said third skin means defining the outboard sides of said device.

30. A device as in claim 1 wherein said third skin means comprise a plurality of strut means.

31. A device as in claim 1 further comprising root cross stem enforcer means formed in said first skin means in corresponding relation to said jiro port means.

32. A device as in claim 31 wherein said root cross stem enforcer means includes a plurality of pressure control means formed therein, whereby fluid flow pressures within said device may be exhausted from said device.

33. A device as in claim 32 wherein said pressure control means are self-actuating.

34. A flow form device of the type used primarily to maintain both vertical and horizontal stability and maneuverability in a predetermined fluid environment, said device comprising: a first skin means of substantially rectangular configuration; a second skin means of corresponding configuration disposed in spaced apart relation from said first skin means, the distance between said first and second skin means varying from the leading edge to the trailing edge of said device; a plurality of third skin means disposed substantially perpendicular to said first and second skin means in interconnecting relation therebetween; a plurality of spor means defined by said first, second and third skin means, said spor means including a domain spor having a width substantially greater than that of the remainder of said spor means, one end of said spor means defining said leading edge, said remainder being closed at their opposite ends to define said trailing edge, said remainder including a plurality of tensor spors formed at the outboard edges of said device; a plurality of first Jordan clusters formed in said first skin means, at least one of said first Jordan clusters communicating with each of said spor means; a corresponding plurality of second Jordan clusters formed in said second skin means, at least one of said second Jordan clusters communicating with each of said spor means, said first and second Jordan clusters being of greatest size at said tensor spors and of correspondingly reducing size toward said domain spor, said first and second Jordan clusters further being spaced apart longitudinally one from the other across at least most of said first and second skin means; a plurality of first holonomic ports formed in said third skin means, each of said first holonomic ports communicating between adjacent pairs of said spor means, said first holonomic ports being of greatest size adjacent said domain spor and of correspondingly reducing size toward said tensor spors, said first holonomic ports further being formed in said third skin means substantially parallel to said leading edge; a jet port means defined by said domain spor being open at its aft end; a jiro port means formed at substantially the center of said second skin means in communicating relation with said domain spor, the diameter of said jiro port means being substantially equal to the width of said domain spor; root cross stem enforcer means formed in said first skin means in corresponding relation to said jiro port means; intransitive hub means formed between said first and second skin means around the midpoint of said device; transitive manifold means formed between said first and second skin means in communicating relation between said intransitive hub means and said jet port means; first and second fluid flow regulating means integrally formed on said first, second and third skin means in fluid communicating relation to said remainder of said spor means, one end of said fluid flow regulating means defining said trailing edge, said fluid flow regulating means being of varying longitudinal dimensions taken along said third skin means and including a plurality of matrix tri-vent means formed in said second skin means and a plurality of second holonomic parts formed in said third skin means; fluid passage means formed through said third skin means defining the inboard sides of said tensor spors; root cross enforcer means formed through said third skin means defining the outboard sides of said device; a payload means depending from said device beneath the area defined by said jiro port means; and control means operatively interconnecting said payload means with said second skin means and said fluid flow regulating means, whereby the passage of said device through a predetermined fluid environment may be controlled with respect both vertical and horizontal planes.

35. A device as in claim 34 wherein said third skin means within said domain spor comprise a plurality of strut means.

36. A device as in claim 34 wherein said third skin means comprises a plurality of strut means.

* * * * *

UNITED STATES PATENT OFFICE
CERTIFICATE OF CORRECTION

Patent No. 3,893,641          Dated July 8, 1975

Inventor(s) Stephen John Sutton

It is certified that error appears in the above-identified patent and that said Letters Patent are hereby corrected as shown below:

Column 2, line 63, "if" should read -- of --.

Column 3, line 18, "undesirably" should read -- undesirable --.

Column 3, line 26, "will" should read -- with --.

Column 3, line 33, "devide" should read -- device --.

Column 4, line 20, "their" should read -- its --.

Column 5, line 67, after "of", second occurrence, insert

-- each of --.

Signed and Sealed this second Day of December 1975

[SEAL]

Attest:

RUTH C. MASON
*Attesting Officer*

C. MARSHALL DANN
*Commissioner of Patents and Trademarks*